Figure 1:
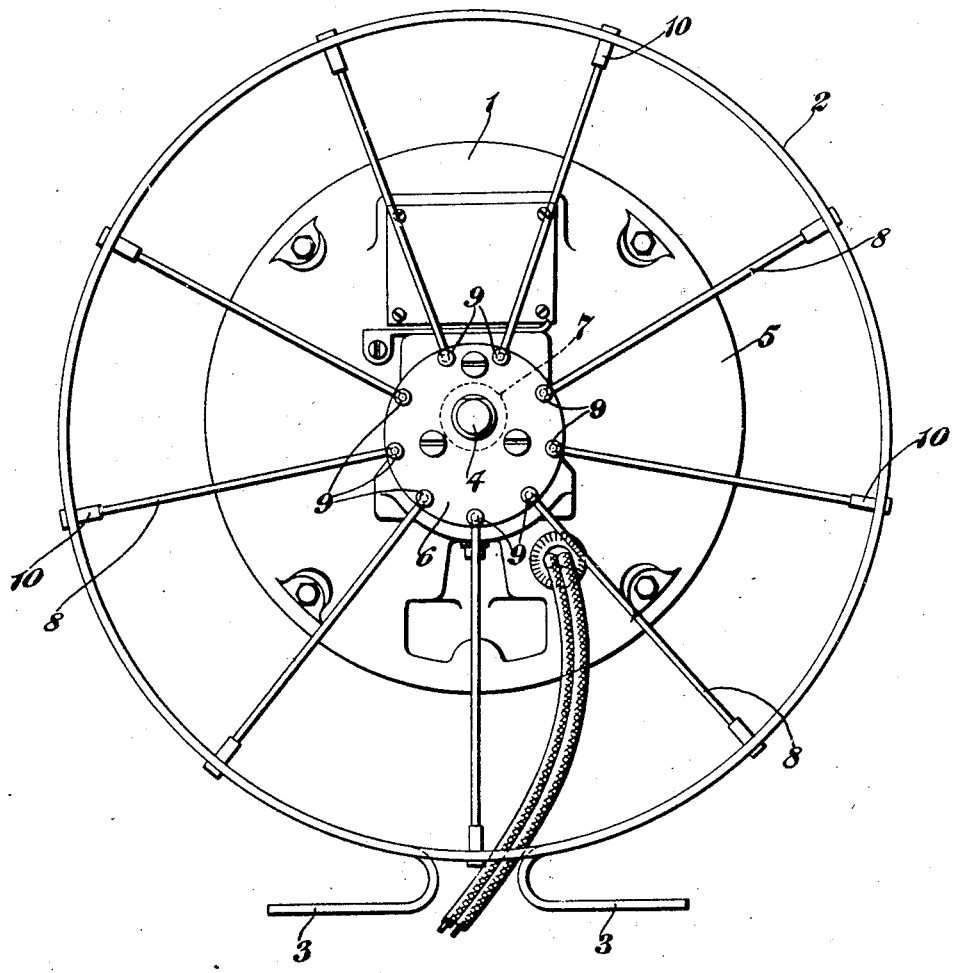

Sept. 22, 1931.    H. I. FINCH    1,824,202
SUPPORT FOR ELECTRIC MOTORS
Filed March 31, 1927    2 Sheets-Sheet 1

Inventor:
Herbert I. Finch,
by Rippey & Kingsland
His Attorneys.

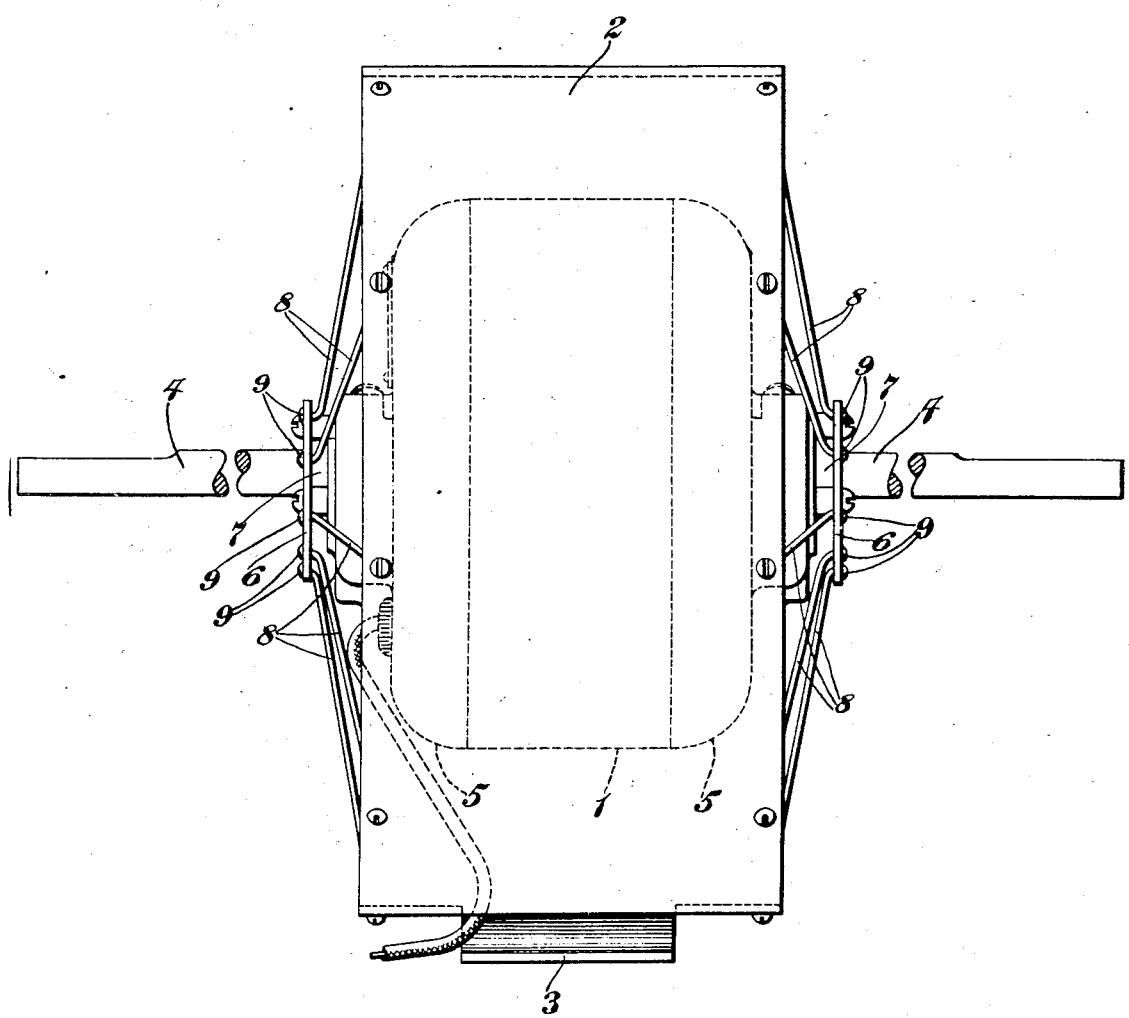

Patented Sept. 22, 1931

1,824,202

UNITED STATES PATENT OFFICE

HERBERT I. FINCH, OF ST. LOUIS, MISSOURI, ASSIGNOR TO THE EMERSON ELECTRIC MFG. CO., OF ST. LOUIS, MISSOURI, A CORPORATION OF MISSOURI

SUPPORT FOR ELECTRIC MOTOR

Application filed March 31, 1927. Serial No. 179,809.

This invention relates to supports for electric motors, and consists in the novel construction hereinafter disclosed.

In the mounting of certain motors, such as ventilating fan motors and the like, in rigid supports and where such motors are used in residences and public places, noise caused by the vibration of the motor or the blades may be extremely objectionable.

It is the purpose of the present invention to provide a support whereby the operation of the motor is rendered practically noiseless.

Another object of the invention is to provide a support for a motor which, while having sufficient rigidity to permanently support the motor, is so constructed that there is enough resiliency to absorb the motor vibrations and thus reduce the sounds emanating by reason of the motor vibration.

Additional advantages of the invention will be apparent from the following detailed description thereof, taken in connection with the accompanying drawings, in which Fig. 1 is an end elevation.

Fig. 2 is a side elevation.

In the embodiment of the invention illustrated in the drawings, the motor 1 is mounted within a metallic drum 2 having outwardly turned flanges 3 which constitute the base for the support of the drum and by which the drum may be supported on a flat surface, or suspended from a flat surface, so that the motor may be either hung in a suspended position, or mounted upon a support and extending vertically upwardly therefrom.

It will be noted that the base 3 is preferably in the form of a spring support, so that there is a sufficient resiliency in the connection between the drum and the permanent support of the motor to retard the vibrations passing to the permanent support.

The motor shaft 4 extends through the motor housing and through end plates 5 of the motor housing. At each end of the motor and connected with the end plates is a disc 6, said discs each having an opening 7 therein through which the motor shaft extends, said opening in the discs being preferably formed eccentrically of the discs. Radial spokes 8 are connected at one end into the discs 6 and extend through openings near each edge of the drum 2. Said spokes are preferably formed with overturned heads 9 that bear against the edges of the openings in the discs 6 and extend outwardly and inwardly, passing through the openings formed in the drum 2, in which they are preferably adjustably supported by threaded sleeves 10 that pass through the openings and thread onto the extremities of said spokes.

As clearly indicated in the drawings, the points of connection of the spokes 8 to the disks 6 are in a different plane from the respective points of support in the drum 2. As illustrated in the drawing, the disk 6 is in a vertical plane outwardly from the vertical plane in which the spokes are attached to the drum.

This structure provides a resilient support of sufficient strength to support the motor. The radial spokes form a yielding structure that yields to the torsional movements of the motor housing and, at the same time, prevents the vibration of the motor from extending to the permanent support to which the base 3 of the drum is attached.

I am aware that the invention may be modified in certain particulars without departing from the spirit and scope thereof, but what I claim and desire to secure by Letters Patent is:—

1. In combination with a motor housing, a motor support including an outer frame, a series of straight yieldable wire spokes extending from the outer frame to the motor housing, said spokes converging toward their inner ends, the points of attachment on the housing being in a different vertical plane from the points of support on the outer frame.

2. In combination with a motor housing, a motor support including an outer frame, a series of straight yieldable wire spokes extending from the outer frame to the motor housing, said spokes converging toward their inner ends, the points of attachment on the housing being in a different vertical plane from the points of support on the outer frame, and a second series of straight wire spokes extending similarly and complementarily from the outer frame to the end of said motor housing.

3. In combination with a motor housing, a motor support comprising an outer frame, a continuous series of straight yieldable wire spokes extending from the outer frame to one end of the motor housing, said spokes diverging at their outer ends, and a second series of straight yieldable wire spokes similarly extending from the outer frame to the other end of the motor housing.

4. A support for a fan unit comprising a separate series of yieldable wire spokes extending outwardly from each end of the motor unit, a connecting member between the inner ends of the spokes of each of said series at opposite ends of the motor unit, an outer support, and connections between the outer ends of the spokes of each series with said outer support.

5. A support for a fan unit comprising a separate series of yieldable wire spokes extending outwardly from each end of the motor unit, a connecting member between the inner ends of the spokes of each of said series at opposite ends of the motor unit, an outer support, and connections between the outer ends of the spokes of each series with said outer support, said spokes converging toward their inner ends and extending radially outwardly and inclined outwardly toward the motor housing.

HERBERT I. FINCH.